Oct. 30, 1962    J. D. ANTHONY    3,061,455

SELF-LOCKING THREADED FASTENER

Filed Feb. 23, 1960

INVENTOR.
JAY D. ANTHONY

BY

Armand G. Cyr
ATTORNEY

3,061,455
SELF-LOCKING THREADED FASTENER
Jay D. Anthony, Hobart, Ind., assignor to Screw and Bolt Corporation of America, a corporation of Pennsylvania
Filed Feb. 23, 1960, Ser. No. 10,475
4 Claims. (Cl. 117—37)

This invention relates to the art of sealing and locking threaded metal members by employment of compositions which permit the interengagement of the parts and then oppose their separation by reason of vibration or other involuntary action.

This application is a continuation-in-part of my application Serial No. 599,361, filed July 23, 1956, now abandoned.

The invention is particularly concerned with the use of two (or more) separated agents of a chemical compound, which, when mixed together by the assembly of component parts, will unite to seal and/or lock by chemical reaction.

In many instances, it is desirable to provide members which are threaded and to have these members secured against later separation under the conditions of vibration or the like. Of course, it will be understood that the threaded members interlocked by my chemical compounds may be manually disassembled at high torque values, when necessary. Mechanical locking devices in the nature of spring pieces, such as split washers, dished washers, locking tongues, mechanical ratchet members, etc. have heretofore been employed for locking threaded members and also cements, solders and the like materials. With the mechanical devices, additional parts are necessary, with attendant difficulties of possible loss of these parts and of their effects upon the elements being assembled, along with the necessity of having a large stock of various sizes of such devices for employment at particular locations. Cements and solders have permitted the securing of nuts, bolts, etc., but in order to separate the parts when these materials are used, it is often necessary to employ heating means or the like and this tends to destroy the assembled parts.

In accordance with the present invention, a split batch is employed consisting, in one instance, of one compound capable of polymerization when mixed with a reacting compound from another batch. More particularly, it is the one purpose of my invention to coat one of the elements to be assembled with the compound from one batch and to coat the other element of the assembly with a reacting compound from another batch. When these two parts are assembled, the compounds will be mixed together, thus polymerizing or copolymerizing and causing an effective seal and adhesive lock between the two parts.

Another method of employing the split chemical batch consists in applying the divided units of the batch on only one component of an assembly. In this embodiment of the invention, one of the compounds will be coated on to one portion of say, the lower threaded part of a bolt, for example, while the compound from the other batch is coated on to the upper adjacent part of the bolt thread. Thus, when this bolt, so treated with my split batch compounds, is threaded on to a mating threaded member, the compound on the lower end of the threaded bolt will mix with the compound on the adjacent upper threaded portion of the bolt and polymerize to seal and lock by adhesion the threaded bolt to the mating threaded member.

Another object of my invention is to apply one of the compounds to the lower threaded portion of the nut, while the compound from the other batch is coated on to the upper adjacent part of the threads on the nut. When the nut, so treated with my split batch compounds, is threaded on to a mating threaded member, such as a bolt for example, the compound on the lower threaded portion of the nut will mix with the compound on the adjacent upper threaded portion of the nut and polymerize or copolymerize to seal and lock by adhesion the threaded nut on to the threaded bolt.

As one example of my improved coating and method of applying the same, I may employ in one batch, crude stock like rubber dissolved in a solvent such as benzol. The compound thus formed in this batch may then be applied at the factory to one portion of the elements to be assembled, either the nut or the bolt by dipping the bolt or nut into the compound, spraying the compound onto the bolt or nut or by any other suitable means.

A second batch or compound may be provided for coating another portion of the threaded bolt or nut and this compound may consist of sulphur and a catalyst or accelerator such as diphenylguanidine. The second portion of the threaded element, bolt or nut may then have another portion of its threads coated with the second compound by means of a brush, spraying or any other suitable method of application.

A still further object is to apply one of the compounds of the split batch on the threads of one side of the bolt and/or nut, and apply the other compound from said split batch on to the threads on the opposite side of said bolt and/or nut, leaving parallel blank spaces between the two compounds. Here again, as the threaded nut is applied to the threaded bolt, the compound on one side of the bolt or nut will be mixed with the compound on the other side of the bolt or nut and polymerize or copolymerize to seal and lock by adhesion the threaded bolt to the threaded nut.

The above two coatings, taken together, represent important parts of rubber compounds capable of polymerization when they are mixed together. However, since the coatings are made separately, no polymerization will take place until the two elements are joined together, at which time the rubber will be cured and vulcanization will take place. For instance, in a fastener assembly where a portion of the bolt threads is coated with rubber dissolved in benzol, and another portion of said bolt threads is coated with the vulcanizing agent consisting of sulphur and a catalyst, the rubber will cure when these two compounds are brought together by the action of the nut applied to said bolt.

This method of providing sealing and locking means for threaded metal members is believed to be novel and provides many advantages over existing methods, both mechanical and chemical. Each element or separate portions thereof can be coated at the factory and maintained in storage until ready for use as an assembly. This storage of the parts can be effected for a reasonable length of time without destroying the effectiveness of the coating and without destroying the effectiveness of the seal and locking action obtained when the two parts are joined together.

Another object of my invention is to provide separated coreactants on threaded metal members capable of polymizing or copolymerizing when brought together during assembly and at the same time provide a protective coating over each of said coreactants to prevent them from mixing and coreacting prior to assembly and at the same time protecting said coreactants from contamination by moisture, dirt, or the like during storage or shipment.

Present locking devices depend on friction to produce their locking efficiency, whereas with the present invention, the two elements of a fastener unit are actually united together as one unit after the parts are brought together. This provides a more efficient seal and greater holding efficiency.

I have found through experimentation that compounds other than those described above may also be employed in the split batch coating of threaded or unthreaded elements of the assembly. For example, I may employ an epoxy resin such as epoxide plastic in lieu of the rubber-benzol solution, and a polyamide resin (such as Versamid resin) as the curing or vulcanizing agent. However, as in the examples above given, one part of the assembly or one portion of one element (bolt or nut) would be coated with one of these compounds while the other element or another portion of said element of the assembly would be coated with the other compound. Here again, the bringing together of these elements, nut and bolt, thus coated will effect a polymerizing action that will result in forming an effective seal between the two parts and effectively lock those parts in assembled relation.

With the foregoing objects outlined and with other objects in view which will appear as the description proceeds, my invention consists in the novel features hereinafter described in detail, illustrated in the accompanying drawing, and more particularly pointed out in the appended claims.

Figure 1:
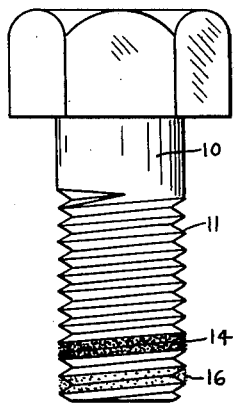
FIG. 1 is a side elevational view of a bolt and showing the two coreactants applied circumferentially on the bolt and spaced from one another.

Referring to the drawing in detail, 10 designates a bolt of metal or other suitable material having conventional screw threads 11, while the reference character 12 designates a nut also having conventional screw threads 13.

As heretofore pointed out, the main purpose of my invention is to employ a split chemical batch, the chemicals in each batch, being capable of polymerization or copolymerization when mixed together.

In carrying out my invention, I propose to spray or otherwise apply on to the threaded portion of the bolt or nut, a thin layer of a chemical compound such as a liquid resin compound, as shown at 14 on the bolt or at 15 on the nut. A second liquid resin compound may be sprayed or otherwise applied to the bolt as shown at 16, or on the nut, as shown at 17.

In this embodiment of the invention, it will be understood that the liquid compounds are applied only on one of the elements, that is, either the bolt 10 or the nut 12, and not on both elements. Also, that the two compounds are spaced from one another to prevent coreaction until the two parts are assembled.

Figure 2:
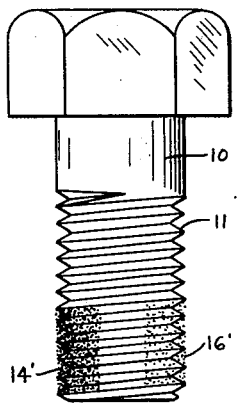
FIG. 2 is a view similar to FIG. 1 but showing the two coreactants applied on the sides of the bolt.
Figure 5:
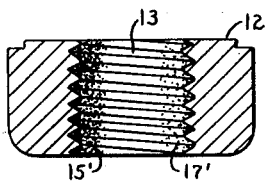
FIG. 5 is a view similar to FIG. 4, but showing the two coreactants applied on the inner side walls of the nut and in spaced vertical relation.

As shown in FIGS. 2 and 5, the respective compounds may be applied on each side of the threads on the bolt 10 or the nut 12, as indicated by the reference characters 14' and 16' on the bolt, or 15' and 17' on the nut 12. Here again, the two compounds are spaced apart to prevent coreaction until the two parts are assembled.

Figure 3:
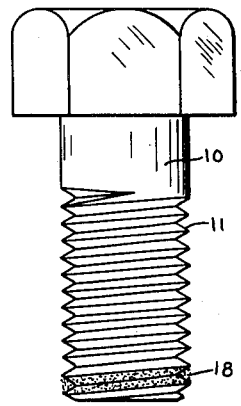
FIG. 3 is a similar view but showing only one of the coreactants applied to the lower threaded end of the bolt.
Figure 4:
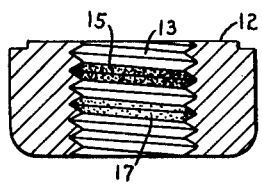
FIG. 4 is a vertical sectional view of a nut with the two coreactants applied thereon in spaced horizontal relation.
Figure 6:
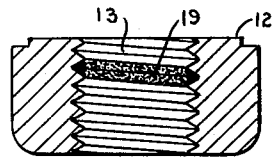
FIG. 6 is a similar view but showing only one coreactant applied on the threads of the nut.

In some instances I have found it necessary to apply the compounds from the split batch on both elements, as shown in FIGS. 3 and 6. In this embodiment of the invention, one of the compounds 18 is applied on to the lower threads of the bolt 10, while the compound from the other batch is applied on the upper threads of the nut as shown at 19.

Figure 9:
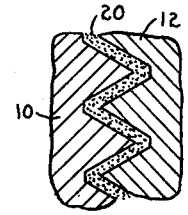
FIG. 9 is a fragmentary sectional view of a bolt and nut in assembled relation and with the coreactants united to form a seal between the two members.

While I have indicated the use of epoxy resin and a polyamide resin, and the use of crude stock such as rubber dissolved in a solvent such as benzol, and sulphur and a catalyst or accelerator such as diphenylguanidine as respective ingredients or compounds for the split batch, I am aware that other compounds may be employed with satisfactory results. The main limitation in the use of compounds in the split batch is that the two compounds be capable of polymerization when mixed together to form a seal and locking action by adhesion between the nut and bolt, as shown at 20 in FIG. 9.

In some instances, for example, where the bolt and nut are to be used in medium temperature environments, that is ranging up to 350° F., I have found that the mixture of epoxy resin and a polyamide resin has a tendency to lose its bonding efficiency. In such instances, I prefer to employ a resinous anhydride as the compound in one batch, while employing the epoxy resin as the compound in the other batch. This resinous anhydride-epoxy resin combination provides a cross linkage that makes the reacted material resistant to heat distortion at temperatures up to 350° F. Also, these resinous anhydrides act to maintain the reacted epoxy adhesion to metals at these higher temperatures.

Figure 7:
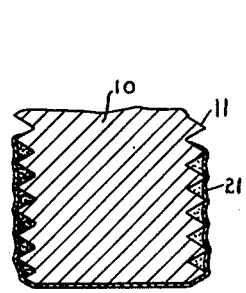
FIG. 7 is a vertical sectional view of a bolt, partly broken away and showing the protective coating over the two coreactants.
Figure 8:
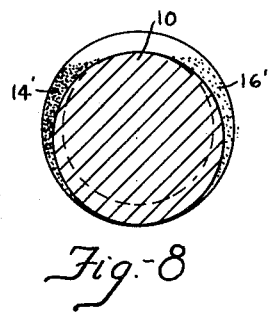
FIG. 8 is a bottom plan view of a bolt shank with the two coreactants on opposite sides of the bolt.

As shown in FIG. 7, I also provide a protective coating or envelope 21 of vinyl or other suitable material which may be applied on the bolt or nut to protect the coreactants from damage, such as contamination from dirt, water, oil or the like during storage and/or shipment.

While I have found that vinyl is particularly adapted for use in protecting the coreactants from damage it is evident that other chemicals or compounds may also be used for the same purpose. However, the material selected for the envelope must be such that it will not react with either of the coreactants or either of the members to be joined. Also, the protective coating 21 must be relatively thin and durable, yet be readily ruptured and torn to permit the mixing of the coreactants when the two parts, nut and bolt, are assembled.

While I have shown and described what I consider to be preferred embodiments of my invention in such manner that the same may be readily understood by those skilled in the art, I am aware that changes may be made in the details disclosed without departing from the spirit of the invention as expressed in the following claims.

What I claim and desire to secure by Letters Patent is:

1. A threaded metal bolt having a first side portion of its threaded surface coated with a first compound and another circumferentially spaced side portion of its threaded surface coated with a second compound, said first and second compounds when mixed together being capable of forming an adhesive polymer, said compounds being brought into contact with each other and mixed together only when said bolt is rotated relative to and in threaded engagement with a mating threaded member to form a locking bond between said members.

2. A threaded metal member according to claim 1 that also includes a strippable protective coating overlying the first and second compounds but incapable of reacting with either of said compounds.

3. A threaded member according to claim 1, in which the coatings on the first and second side portions of the bolt substantially fill the threads of those side portions before the bolt engages a mating threaded member.

4. A threaded metal member having a first side portion of its threaded surface coated with a first compound and a second side portion of its threaded surface, which is circumferentially spaced from the first side portion, coated with a second compound; said first and second compounds when mixed together forming an adhesive polymer; each of said compounds being applied on the threaded surface of said member to a depth greater than the clearance between the threaded surfaces of said member and a mating threaded member; and each of said compounds being successively entrainable by the same portions of the threaded surface of a mating threaded member when one of the members is rotated relative to and in threaded engagement with the other, thereby to intermix the compounds between said engaging threaded surfaces and create a locking bond between the members.

References Cited in the file of this patent

UNITED STATES PATENTS

| | | |
|---|---|---|
| 992,331 | Briesen | May 16, 1911 |
| 1,497,952 | Smith | June 17, 1924 |
| 2,321,414 | Parker | June 8, 1943 |
| 2,423,171 | Book | July 1, 1947 |
| 2,489,145 | Lieb et al. | Nov. 22, 1949 |
| 2,517,778 | Fischer | Aug. 8, 1950 |
| 2,663,662 | Graf et al. | Dec. 22, 1953 |
| 2,666,354 | Dim et al. | Jan. 19, 1954 |
| 2,671,158 | Rubenstein | Mar. 2, 1954 |
| 2,705,223 | Renfrew et al. | Mar. 29, 1955 |
| 2,765,288 | Whittier et al. | Oct. 2, 1956 |
| 2,817,620 | Golick et al. | Dec. 24, 1957 |
| 2,939,805 | Johnson | June 7, 1960 |

FOREIGN PATENTS

| | | |
|---|---|---|
| 571,322 | Great Britain | Aug. 20, 1945 |
| 514,296 | Canada | July 5, 1955 |